United States Patent [19]

Sondrol

[11] Patent Number: 5,418,580
[45] Date of Patent: May 23, 1995

[54] INTERCHANGEABLE LENS EYEGLASSES WITH PIVOTING TEMPLE RELEASE MECHANISM

[75] Inventor: Larry L. Sondrol, 9375 71st St. S., Cottage Grove, Minn. 55016

[73] Assignee: Larry L. Sondrol, Cottage Grove, Minn.

[21] Appl. No.: 270,990

[22] Filed: May 5, 1994

[51] Int. Cl.6 .......................... G02C 5/00; G02C 9/02
[52] U.S. Cl. ........................................ 351/47; 351/92; 351/95; 351/140
[58] Field of Search ................ 351/42, 47, 57, 59, 351/63, 86, 90, 92, 95, 96, 99, 106, 107, 111, 119, 121, 140, 153

[56] References Cited

U.S. PATENT DOCUMENTS

| | | | |
|---|---|---|---|
| 3,229,303 | 1/1966 | Jonassen | 351/92 |
| 3,542,460 | 11/1970 | Smith et al. | 351/106 |
| 3,709,587 | 1/1973 | Wick | 351/106 |
| 3,838,914 | 10/1974 | Fernandez | 351/106 |
| 4,153,347 | 5/1979 | Myer | 351/90 |
| 4,176,921 | 12/1979 | Matthias | 351/106 |
| 4,304,469 | 12/1981 | Solomon | 351/121 |
| 4,523,819 | 6/1985 | Dianitsch et al. | 351/106 |

Primary Examiner—William L. Sikes
Assistant Examiner—David R. Parsons

[57] ABSTRACT

An attachment for eyeglass frames which permits the wearer to quickly replace lenses without the use of optical hand tools or equipment, and which does not require the dexterity usually associated in working with miniature optical parts. The invention is permanently affixed to the eyeglasses, eliminating the possibility of loss, damage or disconnection. The invention is designed for use in instances where changing light conditions necessitate the need for tinted or sunglasses but where carrying additional frames is neither practical or desireable.

5 Claims, 4 Drawing Sheets

INTERCHANGEABLE LENS EYEGLASSES WITH PIVOTING TEMPLE RELEASE MECHANISM

BACKGROUND OF THE INVENTION

1. Technical Field

The present invention relates to a manufacturer installed attachment providing wearers of prescription lenses the capability to substitute lenses without the use of optical tools, special tools or specialized dexterity.

2. Description of Prior Art

Replacement or substitution of eyeglass lenses currently falls into two categories: those mounted in plastic frames, and those mounted in metal frames.

Lens replacement in plastic frames is generally accomplished by heating the frames to the extent that the lenses may be forced out of the mounting groove. This is normally accomplished by personnel skilled in the trade.

Lens replacement in metal frames require the removal of a miniature screw which releases tension applied by a split frame. Although there are several innovations of prior art facilitating lense removal, all require specialized tools or manual dexterity to accomplish the lense substitution. The need for such tools, equipment or dexterity is considered a drawback to "in the field" substitution of lenses.

SUMMARY OF THE INVENTION

It is the object of the invention to provide a method by which wearers of prescription eyeglasses may substitute lenses quickly and easily in any location, without the use of optical tools or equipment. The principle use for the invention will be in instances where changing light conditions could cause discomfort or a hazardous visibility condition. Outdoor sporting and recreational activities as well as bicycle, motorcycle and automobile drivers will benefit by the availability of the invention. Substitute lenses, which are highly portable, will in many cases eliminate the necessity of a second pair of tinted or sunglasses.

A secondary advantage of the invention permits fashion conscious persons to carry a variety of tinted colors to match clothing selections.

The foregoing and other features and advantages of this invention will be apparent to those skilled in the art from a consideration of the drawings and detailed description which is enclosed hereinafter; and it will be recognized that variations to the embodiments which may occur in practice fall within the intent and purpose of the invention.

A BRIEF DESCRIPTION OF THE DRAWINGS

The present invention will be more fully understood by reference to the following detailed description thereof when read in conjunction with the attached drawings, and wherein:

FIG. 1 is a partial perspective view of a pair of eyeglasses as seen in the orientation in which they would be worn. The component parts being the main temple 1, front temple 2, upper frame 3, lower frame 4, and the attachment 5 in its assembled and installed position.

FIG. 2 is a similar view except that the main temple 1 is shown in the pivoted position thereby activating the attachment 5 and effecting the separation of the upper frame 3 and the lower frame 4, thereby allowing for easy removal of the lens.

FIG. 3A and 3B are respectively an enlarged top and side view of the pivot plate 10, which is the first of the component parts which in their entirety comprise the attachment 5. Shown is the surface 11 which is fastened to the main temple 1. The pivot hole 12 and the traversing slot 13 are also shown in their relative locations.

FIG. 4A and 4B are respectively an enlarged top and side view of the slide plate 20, which is the second of the component parts of the attachment 5. In this depiction surface 21 is fastened to the lower frame 4. The traverse pin 22 and the slide aperture 23 are shown in their respective locations.

FIG. 5A and 5B are respectively an enlarged top and side view of the cover 30, which is the third component part of the attachment 5, and on which the pivot hole 31 is shown in its location.

Figure 8:
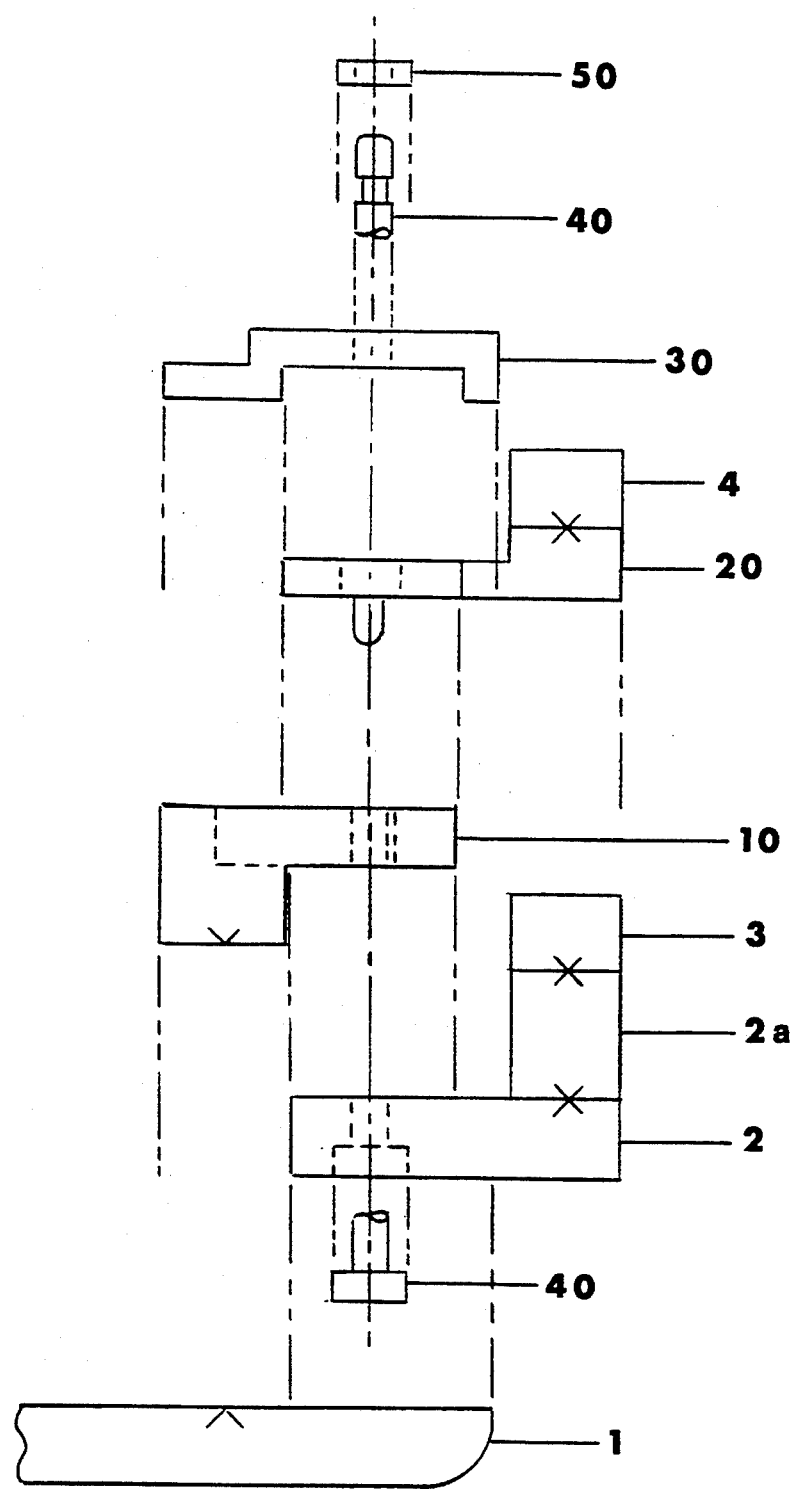

FIG. 8 is an enlarged exploded top view of the main temple 1, pivot pin 40, front temple 2 with standoff 2a, upper frame 3, pivot plate 10, slide plate 20, lower frame 4, cover 30, and retaining ring 50, all of which, reading from bottom to top, illustrate the order in which the invention is assembled. In this view the assemblage on the right side of the eyeglasses is illustrated.

A DETAILED DESCRIPTION OF THE INVENTION

Figure 1:
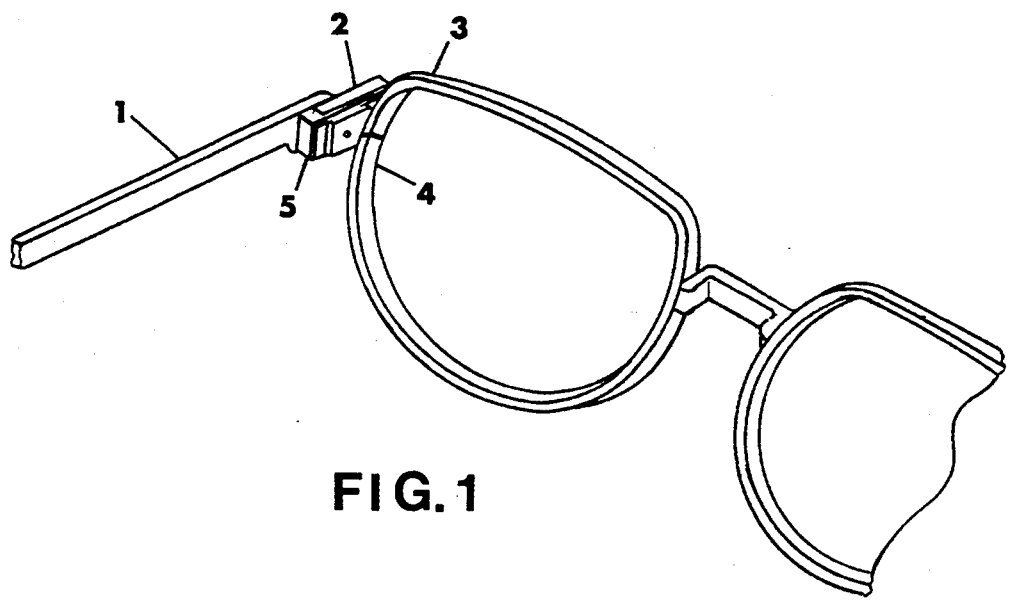

Referring first to FIG. 1 it can be seen that the attachment 5 is fastened to the left side of the eyeglasses from a perspective of the viewer. It should be noted that the invention also requires a similar but mirror image configuration of all parts on the right side of the eyeglasses.

Figure 3A:
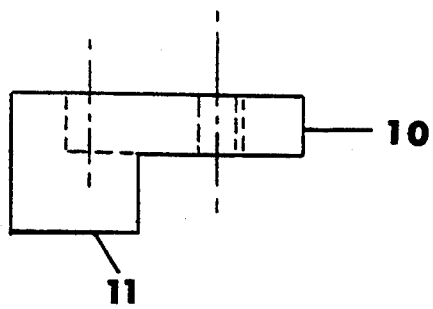
Figure 3B:
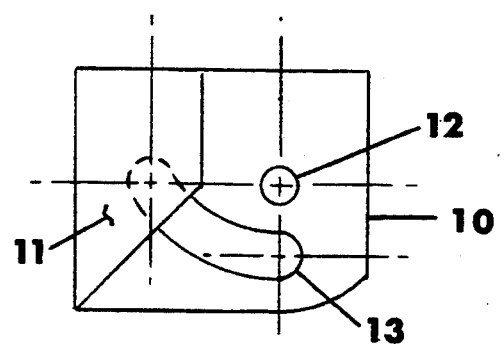
Figure 4A:
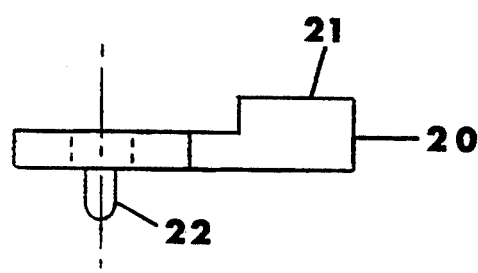
Figure 4B:
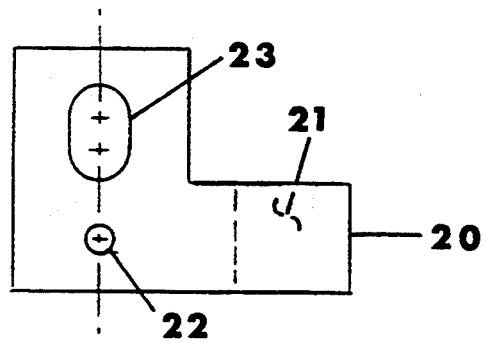
Figure 5A:
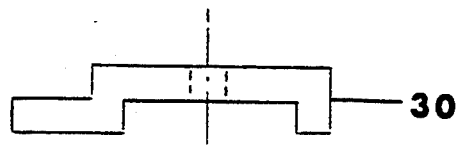
Figure 5B:
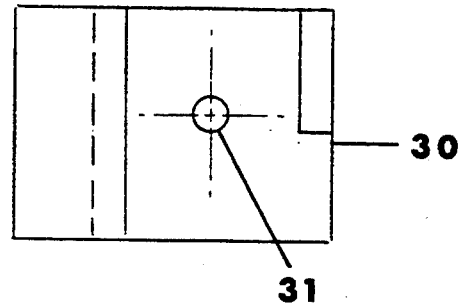
Figure 6:
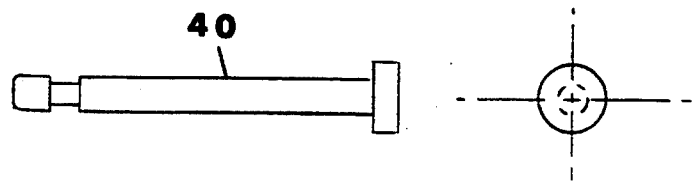
FIG. 6 is an enlarged view of the pivot pin 40, about which the attachment 5 operates.
Figure 7:
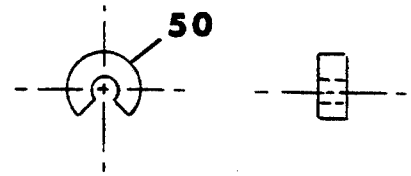
FIG. 7 is an enlarged view of the retaining ring 50 which maintains the position of the foregoing component parts.

Referring next to FIG. 8 it can be seen that the recommended sequence of assembly of the invention begins with placing the main temple 1 on a work surface with the inside surface facing up. The spacer block 2a is then permanently affixed to the front temple 2, the purpose of such block being to bring the upper frame 3 and the lower frame 4 into alignment upon completion of the assembly. The pivot pin 40 is then inserted through a hole provided in the front temple 2, and then through the hole 12 of the pivot plate 10 depicted in FIG. 3B. The pivot plate 10 is next permanently affixed to the main temple 1 as projected in FIG. 8, in the area shown as 11 in FIG. 3B, thereby trapping the front temple 2 in position while still allowing the main temple 1 and the pivot plate 10 to be actuated about it. The slide plate 20 is next placed over the pivot pin 40 with said pin going through the slide aperture 23 detailed in FIG. 4B. When positioned the traverse pin 22 portion of the slide plate 20 will fit in the traverse slot 13 of the pivot plate 10. Details of the traverse pin 22 are as shown in FIG. 4A and 4B; the encompassing traverse slot 13 as detailed in FIG. 3B. The cover 30 is then placed over the pivot pin 40. The configuration of the cover 30 is such that the slide plate 20 is trapped with the slide aperture 23 in a vertical orientation permitting only up and down movement but still allowing the main temple 1 to be pivoted without interference. The retaining ring 50 is then placed over the end of the pivot pin 40 thereby unitizing the attachment 5. The final steps of assembly consist of permanently affixing the lower frame 4 to the portion of slide plate 20 denoted as 21 in FIG. 4A and 4B; and permanently fastening the upper frame 3 to the standoff 2a as shown in FIG. 8.

Figure 2:
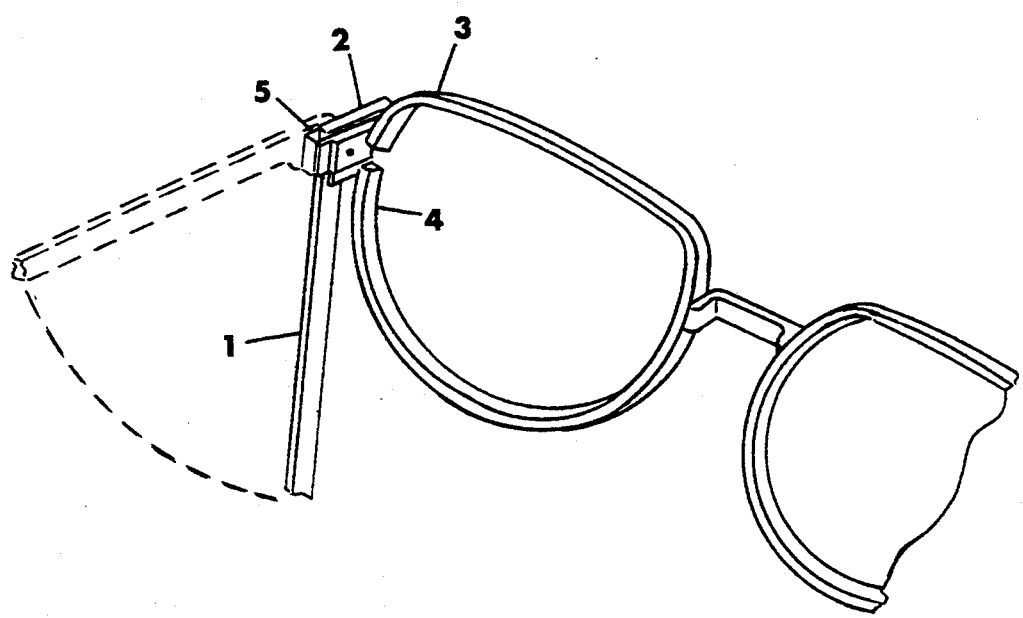

With the assembly complete the function of the invention will now become apparent. In essence the assembly on each side of the eyeglasses becomes a three part configuration in which the first part comprising the front temple 2 and the upper frame 3 being fastened together remain in a stable, horizontal position. The second part of the configuration contains the pivot plate 10 which being fastened to the main temple 1 pivots about the pivot pin 40 which in turn is in place through hole 12 as seen in FIG. 3B. When the main temple 1 is pivoted as shown in FIG. 2 the orientation of the pivot plate 10 rotates 90 degrees counterclockwise from that shown in FIG. 3B. This in turn lengthens the vertical distance between the pivot hole 12 and the traverse slot 13. The third part of the configuration contains the slide plate 20 on which the traverse pin 22 is now entrapped in the traverse slot 13 of the pivot plate 10. The pivot pin 40 will at first be located at the bottom of the slide aperture 23, however as the main temple 1 and the attached pivot plate 10 are pivoted the slide plate 20 is forced downward as the traverse pin 22 follows the track of the traverse slot 13. The slide plate 20 is free to travel only in an up and down direction due to the design of the cover 30. The lower frame 4 which is attached to the slide plate 20 thus moves with the action of the pivot to create the gap between upper and lower frames as shown in FIG. 2. Creation of said gap releases tension on the lenses permitting easy substitution. With different lenses in place the pivoting motion is reversed to the normal wearing orientation shown in FIG. 1.

I claim:

1. Eyeglasses which allow for the removal and replacement of lenses comprising;
    a pair of lenses,
    a pair of temple arms,
    a pair of split frames, each having a medial side and a lateral side, wherein each frame is split on said lateral side forming an upper lateral frame portion and a lower lateral frame portion, each of said lateral frame portions having an end,
    a bridge attached to and connecting the medial side of each of said pair of split frames, and
    a pair of attachment means for attaching each of said temple arms to said upper and lower lateral frame portions of each of said pair of split frames, wherein each said attachment means secures one of said lenses within one of said split frames by bringing together said ends of said upper and lower lateral frame portions when said temple arm is positioned perpendicular to a first vertical plane containing said lenses, said split frames and said bridge, and wherein each said attachment means allows one of said lenses to be removed from one of said split frames and replaced by separating said ends of said upper and lower lateral frame portions when said temple arm is rotated to a position parallel to said first vertical plane and perpendicular to a second horizontal plane which is perpendicular to said first vertical plane and extends through said bridge and a horizontal cross section of said lenses and said split frames.

2. Eyeglasses according to claim 1 wherein each of said attachment means comprises:
    a front temple portion which contains a pivot hole and is attached to one of said temples and said upper lateral frame portion,
    a pivot plate which contains an arcuate traversing slot and a pivot hole, and is attached to one of said temples and said front temple portion,
    a slide plate which is connected to said lower lateral frame portion and which comprises a slide aperture and a traverse pin which engages said arcuate traversing slot of said pivot plate and,
    a pivot pin which extends through said pivot hole of said front temple portion, said pivot hole of said pivot plate and said slide aperture of said slide plate and is oriented parallel to both said first vertical plane and said second horizontal plane,
    wherein rotation of said temple about said pivot pin causes said traverse pin of said slide plate to move along said arcuate traversing slot of said pivot plate which in turn varies the distance between said ends of said upper and lower lateral frame portions.

3. Eyeglasses according to claim 2 wherein each of said attachment means further comprises a cover plate which contains a pivot hole and is located on a side of said slide plate opposite from said pivot plate, wherein said pivot pin extends through said pivot hole of said cover plate.

4. Eyeglasses according to claim 1 wherein said pair of lenses are ophthalmic lenses which provide a user with vision correction.

5. Eyeglasses according to claim 1 wherein said pair of lenses are tinted.

* * * * *